United States Patent
Hall et al.

(10) Patent No.: US 8,149,090 B2
(45) Date of Patent: Apr. 3, 2012

(54) MOBILE WIRELESS NETWORK FOR ASSET TRACKING AND SUPPLY CHAIN MONITORING

(75) Inventors: Stewart E. Hall, Wellington, FL (US);
Douglas A. Narlow, Coral Springs, FL (US)

(73) Assignee: Sensormatic Electronics, LLC, Boca Raton, FL (US)

( * ) Notice: Subject to any disclaimer, the term of this patent is extended or adjusted under 35 U.S.C. 154(b) by 192 days.

(21) Appl. No.: 12/193,384

(22) Filed: Aug. 18, 2008

(65) Prior Publication Data
US 2010/0039284 A1    Feb. 18, 2010

(51) Int. Cl.
*G05B 19/00*    (2006.01)
(52) U.S. Cl. .................................. 340/5.92; 705/28
(58) Field of Classification Search .............. 340/5.92; 705/28, 22; 235/385
See application file for complete search history.

(56) References Cited

U.S. PATENT DOCUMENTS

| | | | |
|---|---|---|---|
| 2008/0040244 A1 | 2/2008 | Ricciuti et al. | |
| 2008/0079567 A1* | 4/2008 | Poor | 340/540 |
| 2008/0221836 A1* | 9/2008 | Tateson | 702/188 |
| 2008/0238657 A1* | 10/2008 | Hupp et al. | 340/539.1 |

FOREIGN PATENT DOCUMENTS

| | | |
|---|---|---|
| DE | 102005019064 A1 | 8/1996 |
| WO | 2005071364 A1 | 8/2005 |
| WO | 2008021874 A1 | 2/2008 |

OTHER PUBLICATIONS

International Search Report dated Jan. 22, 2010 for International Application Serial No: PCT/US2009/004290, International Filing Date Jul. 22, 2009 consisting of 14-pages.

* cited by examiner

*Primary Examiner* — Thomas Mullen
(74) *Attorney, Agent, or Firm* — Alan M. Weisberg; Christopher & Weisberg, P.A.

(57) ABSTRACT

A method, system and mobile sensor node for monitoring a supply chain. A communication network is established which includes a plurality of mobile sensor nodes. Status information for each mobile sensor node is periodically transmitted. Each mobile sensor node receives status information for at least one other mobile sensor node in the communication network. A log file which includes the received status information is compiled and stored in the mobile sensor node that received the corresponding status information.

20 Claims, 6 Drawing Sheets

MOBILE WIRELESS NETWORK FOR ASSET TRACKING AND SUPPLY CHAIN MONITORING

CROSS-REFERENCE TO RELATED APPLICATION n/a

STATEMENT REGARDING FEDERALLY SPONSORED RESEARCH OR DEVELOPMENT n/a

FIELD OF THE INVENTION

The present invention relates generally to a method, system and mobile sensor node for asset tracking and supply chain monitoring, and more specifically, to a method and system for collecting and saving information from mobile sensor nodes attached to merchandise when individual asset tags are stolen or removed from the merchandise.

BACKGROUND OF THE INVENTION

Inventory theft, often referred to as "shrinkage," is a major problem for manufacturers, wholesalers and retailers. In addition to losses from shoplifting, supply chain theft has increasingly become a major source of loss. Combating supply chain theft is very difficult because the theft often occurs during shipping or while merchandise is in storage, when the merchandise is accessible to thieves and when the theft cannot be easily detected. It is also difficult and expensive to conduct inventory checks of merchandise at enough points in the supply chain to identify when and where a theft is happening in order to build a case for prosecution.

RFID systems are intended to help manufacturers, wholesalers and retailers combat supply chain theft by rendering the merchandise inventory process less expensive. By employing RFID tags on pallets or cases of merchandise during storage or transit, theft of entire pallets or cases of merchandise may be detected. By using item level RFID tags, theft of individual packages of merchandise can be detected. Passive RFID tags can only be used for checking inventory at various points in the supply chain.

Currently, active RFID tags may include integrated sensors that can be used to monitor the vibration or environmental conditions of merchandise. With this information, monitoring systems can determine if merchandise has been subjected to shock, vibration or other extreme environmental conditions that may damage the merchandise. By time-stamping any alert or alarm conditions triggered by these sensors, law enforcement authorities or other authorized persons may determine when damage occurs. However, these sensors cannot be used to determine when a theft has occurred because the relevant information is actually stored on the RFID tag. Thus, when the merchandise is stolen, its active RFID tag, including all the stored information, is gone.

Therefore, what is needed is a system capable of collecting and saving information about merchandise such that the stored information may be retrieved even when individual asset tags are stolen or removed from the merchandise.

SUMMARY OF THE INVENTION

The present invention advantageously provides a method, mobile sensor node and system for monitoring a supply chain. Generally, the present invention advantageously provides a method for monitoring a location of a supply chain by attaching mobile sensor nodes to corresponding items being monitored. The mobile sensor nodes automatically establish a mesh network and periodically transmit status information relating to all the mobile sensor nodes in the mesh network. The status information is retained by all the mobile sensor nodes in the mesh network, such that even if one or more mobile sensor nodes are lost, damaged or destroyed, the remaining nodes are able to determine the conditions occurring when the affected node(s) stopped communicating.

One aspect of the present invention provides a method for supply chain monitoring, the method by establishing a communication network which includes a plurality of mobile sensor nodes. Status information is periodically transmitted for each mobile sensor node. Each mobile sensor node receives status information for at least one other mobile sensor node in the communication network. A log file that includes the received status information is compiled and stored in the mobile sensor node that received the corresponding status information.

In accordance with another aspect, the present invention provides a system for supply chain monitoring. The system includes a plurality of mobile sensor nodes, each mobile sensor node communicatively coupled to at least one other mobile sensor node, a data collection server, and a network bridge. The network bridge is communicatively coupled to the data collection server and to at least one mobile sensor node of the plurality of mobile sensor nodes. The network bridge operates to receive at least one log file containing status information for each mobile sensor node and transmit the log file to the data collection server.

In accordance with yet another aspect, the present invention provides a mobile sensor node in a communication network for supply chain monitoring. The mobile sensor node includes a transceiver, a processor, and a memory. The processor is communicatively coupled to the transceiver and the memory. The transceiver operates to receive status information for other mobile sensor nodes in the communication network and periodically transmit status information for each mobile sensor node in the communication network. The processor operates to compile a log file that includes status information for each mobile sensor node in the communication network. The memory stores the log file.

BRIEF DESCRIPTION OF THE DRAWINGS

A more complete understanding of the present invention, and the attendant advantages and features thereof, will be more readily understood by reference to the following detailed description when considered in conjunction with the accompanying drawings wherein.

DETAILED DESCRIPTION OF THE INVENTION

Before describing in detail exemplary embodiments that are in accordance with the present invention, it should be observed that the embodiments reside primarily in combinations of apparatus components and processing steps related to implementing a system and method for collecting and saving information about merchandise such that the stored information may be retrieved even when individual asset tags are stolen or removed from the merchandise. Accordingly, the apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. Additionally, as used herein and in the appended claims, the term "Zigbee" relates to a suite of high-level wireless communication protocols as defined by the Institute of Electrical and Electronics Engineers ("IEEE") standard 802.15.4. Further, "Wi-Fi" refers to the communications standard defined by IEEE 802.11. "Ethernet" refers to the communication standard defined by IEEE 802.3. The term "WiMAX" means the communication protocols defined under IEEE 802.16. "BLUETOOTH" refers to the industrial specification for wireless personal area network ("PAN") communication developed by the Bluetooth Special Interest Group.

One embodiment of the present invention advantageously provides a system and method for asset tracking and supply chain monitoring utilizing a mobile sensor mesh network to detect and record on each of the distributed network nodes the presence or absence of each of the other nodes in its vicinity and the approximate time when nodes either enter or leave the vicinity.

In an alternate embodiment, the system may share and store, in a distributed fashion, information about other nodes so that the collection of each of the nodes possesses a large data capture indicating when items are joined together or separated from one another. At various points along the supply chain, the system reads the collection of nodes to reconstruct the shipping history of the products and can determine when items were separated from the group to identify shrinkage in the supply chain.

Figure 1:
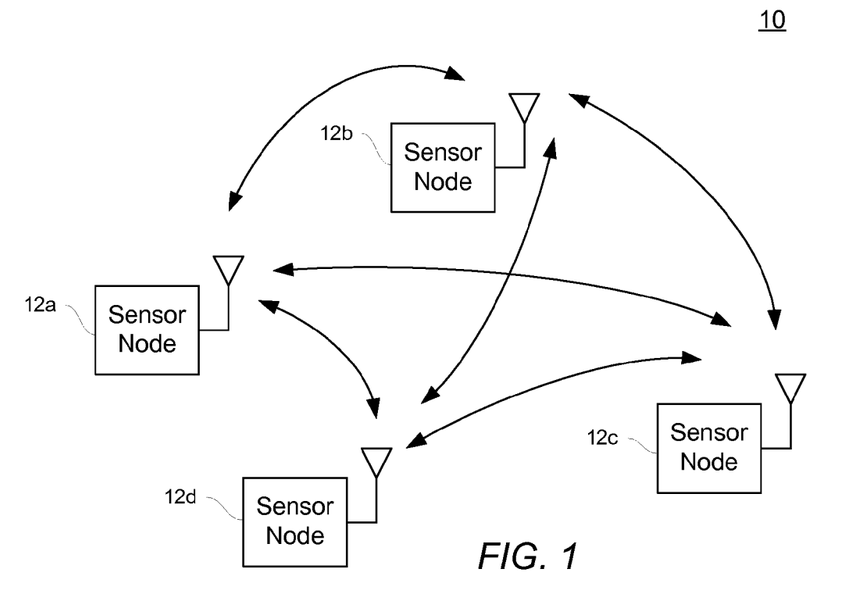
FIG. 1 is a block diagram of an exemplary mobile sensor mesh network constructed in accordance with the principles of the present invention.

Referring now to the drawing figures in which like reference designators refer to like elements, there is shown in FIG. 1, an exemplary mobile sensor mesh network constructed in accordance with the principles of the present invention, and designated generally as "10." Mobile sensor mesh network 10 includes a plurality of mobile sensor nodes 12a, 12b, 12c, 12d (referenced collectively as mobile sensor node 12) for monitoring the status of individual items or groups of merchandise. Although only four mobile sensor nodes 12 are shown in FIG. 1 for purposes of illustration, a mobile sensor mesh network 10 may include hundreds or even thousands of individual sensor nodes 12. For example, groups of merchandise are often packaged together in bulk shipping containers such as boxes, cases or pallets to facilitate efficient transportation. A mobile sensor node 12 may be placed on or attached to each item or group of merchandise.

Each of the mobile sensor nodes 12 is in communication with all of the other mobile sensor nodes 12 that are within communication range, forming a mesh network 10 of the individual sensor nodes 12. The mobile sensor nodes 12 may communicate with each other and/or a network bridge node (See FIG. 3) using any combination of commonly used wired and/or wireless communication protocols such as Transmission Control Protocol/Internet Protocol ("TCP/IP"), Time Division Multiple Access ("TDMA"), Global System for Mobile communications ("GSM"), General Packet Radio Service ("GPRS"), Enhanced Data Rates for GSM Evolution ("EDGE"), Third Generation Protocols ("3G"), 4G, EvDO, CDMA, Ethernet, Wi-Fi, WiMAX, Zigbee, BLUETOOTH, etc.

Data collected by one of the sensor nodes 12 is shared with other nodes 12 in the vicinity so that if that sensor node 12 is lost, for example, during a theft, its data is retained by the other sensor nodes 12 that are in the vicinity. For example, a mobile sensor mesh network 10 may be formed by placing a mobile sensor node 12 on each pallet loaded onto a truck or other shipping container. By having each of the individual mobile sensor nodes 12 share its information with all of the other nodes 12 in the vicinity, a collective data log is maintained by all of the sensor nodes. This data may be used to determine useful information about what happened to merchandise during shipping or storage by reading time information or other sensor data, e.g., notification of an alarm condition, time and geographic location of mobile sensor node during alarm condition, time and geographic location of last communication with the lost mobile sensor node, etc. Because the data is stored collectively, useful information is not lost if the sensor node 12 is stolen along with the merchandise.

Alternatively, in the case of a network having hundreds or thousands of sensor nodes 12, an efficient method for distributing the data store may be more complex than having all of the sensor nodes 12 storing all of the data. In this case, the data redundancy may allow for data to be randomly distributed amongst the sensor nodes 12 such that in the event of the theft or destruction of one or more nodes the likelihood of any one piece of data being lost is statistically below a risk threshold considered acceptable. As the collection of nodes 12 grows in size, the amount of random data spreading that can be utilized increases. This data spreading process has the effect of reducing the physical memory requirements of an individual node 12.

Another alternative method for improving the data storage requirements is to allow sensor nodes 12 to randomly reduce the time domain resolution of the data in storage. For instance, in situations where a mobile sensor mesh network 10 is in the supply chain and the status of all the sensors is "quiet" (i.e., all nodes are accounted for and no significant events are recorded), the individual sensor nodes 12 may be able to randomly reduce the time domain resolution of data from these periods of time. Since each of the nodes 12 is randomly deleting data in the time domain, it is likely that some data from these quiet periods would still be retained in the collective memory of the network 10. In this situation, the granularity of the data would be reduced, but because these are "quiet" periods, the risk of losing useful information is low.

Figure 2:
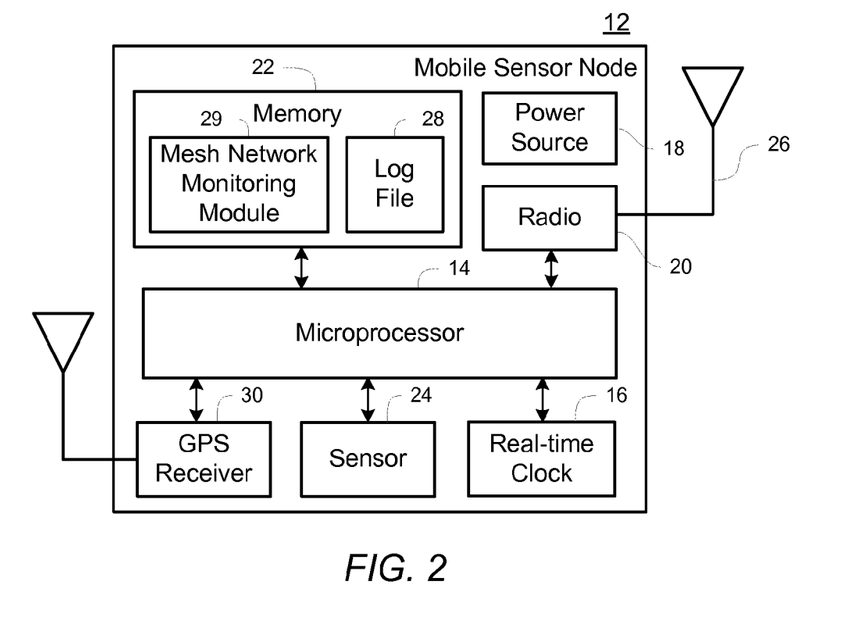
FIG. 2 is a block diagram of an exemplary mobile sensor node constructed in accordance with the principles of the present invention.

Referring now to FIG. 2, an exemplary mobile sensor node 12 constructed in accordance with the principles of the present invention may include a processor 14 (e.g., a microprocessor), a real-time clock 16, a power source 18, a network radio 20 (e.g., a transceiver), a memory 22 (which may include non-volatile memory, volatile memory, or a combination thereof), and one or more on-board sensors 24. The real-time clock 16 is used to associate an event detected through the on-board sensors 24 with an actual time of occurrence. The processor 14 controls radio communications, sleep and wake modes, readings from the on-board sensors 24, storage of data to memory 22, and communication of stored data to other sensor nodes 12. The power source 18, such as a battery, is self-contained and supplies electricity to the mobile sensor node 12. The power source 18 may include provisions for recharging between deployments of the mobile sensor node 12 into the supply chain. The network radio 20 communicates with other sensor nodes 12 and with bridge nodes (See FIG. 3) by transmitting and receiving radio frequency ("RF") communication signals through an antenna 26 in a well-known manner.

The memory 22 may include a log file 28 including data generated by the processor 14 and/or received from other sensor nodes 12. Additionally, the memory may include a mesh network monitoring module 29 containing program instructions for monitoring the mesh network 10. Operation of the mesh network monitoring module 29 is discussed in greater detail below.

On-board sensors 24 may be included to measure environmental conditions. These environmental conditions may include a wide variety of parameters, such as acceleration, temperature, light, humidity, spatial orientation, vibration, etc., depending upon the requirements and adaptations needed for a specific implementation. The mobile sensor node 12 may further include a Global Positioning System ("GPS") receiver 30 to provide GPS location information.

Figure 3:
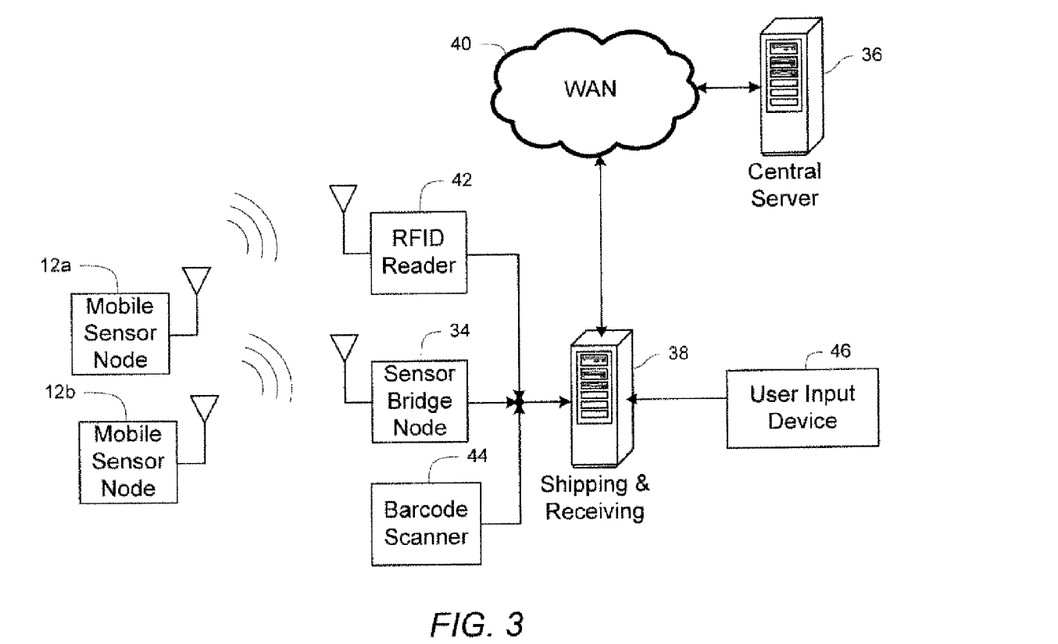
FIG. 3 is a block diagram of an exemplary mobile sensor mesh network data collection system constructed in accordance with the principles of the present invention.

FIG. 3 is a block diagram of an exemplary mobile sensor mesh network data collection system 32 constructed in accordance with the principles of the present invention. The mobile sensor mesh network data collection system 32 connects sensor network bridge nodes 34 (one shown) to a central data collection server 36. The network bridge node 34 may communicate with a local data collection server 38 located in one facility of the supply chain, such as a shipping and receiving server, that is in communication with the central data collection server 36 through a wide area network ("WAN") 40. The network bridge nodes 34 are used to communicate with the mobile sensor nodes 12 and to collect data at various points within the supply chain. The data collection servers 36, 38 collect data from the sensor network bridge nodes 34 and analyze the data to identify losses and to identify suspicious activity for further investigation. The data collection servers 36, 38 include one or more collection databases (not shown) or may be communicatively coupled to one or more external collection databases (not shown).

The wide area network 40 may include the Internet, intranet, or other communication network. Although the communication network is pictured in FIG. 3 as being a WAN, the principles of the present invention may also apply to other forms of communication networks, such as personal area networks ("PANs"), local area networks ("LANs"), campus area networks ("CANs"), metropolitan area networks ("MANs"), etc., such as the Internet or an intranet. Alternatively, the network bridge node 34 may communicate directly with the central data collection server 36 through the WAN 40.

Additionally, the mobile sensor mesh network data collection system 32 may include optional devices such as a Radio Frequency Identification ("RFID") reader 42, a barcode scanner 44, and other user devices 46 which may provide input to the data collection system 32.

Figure 4:
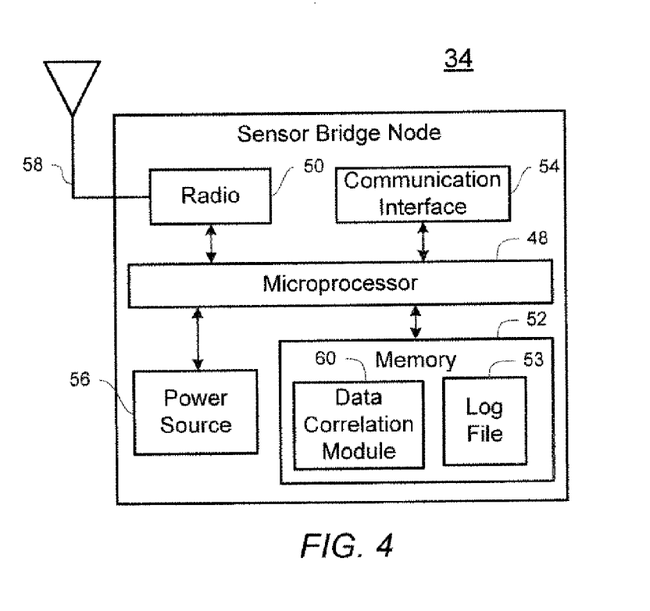
FIG. 4 is a block diagram of an exemplary sensor bridge node constructed in accordance with the principles of the present invention.

Referring now to FIG. 4, a network bridge node 34 constructed in accordance with the principles of the present invention is used to communicate with the individual mobile sensor nodes 12 and to collect information stored within each of these sensor nodes 12. The network bridge node may include a microprocessor 48 communicatively coupled to at least a network radio 50, a memory 52, a communication interface 54 and a power source 56. The microprocessor 48 supervises and performs the various functions of the sensor bridge node 34 including communication with the individual mobile sensor nodes 12, storage of data to memory 52, and other functions described herein. The network radio 50 communicates with the mobile sensor nodes 12 through an antenna 58 in a well-known manner. The power source 56, such as a battery or other DC or AC power input, supplies electricity to power the sensor bridge node 34.

The memory 52 may be used to store information locally, including a data correlation module 60 containing program instructions for collecting, organizing and reporting data collected from the mobile sensor nodes 12 and the associated data which is recorded in a log file 53. The operation of the data correlation module 60 is discussed in greater detail below. The memory 52 may be a non-volatile memory, including but are not limited to, a hard drive, a memory stick, an Electrically Erasable Programmable Read-Only Memory ("EEPROM"), a flash memory, etc. Additionally, instead of or in addition to non-volatile memory, the memory 52 may be included as some form of volatile memory, e.g., RAM.

The communication interface 54 controls the exchange of information between the sensor bridge node 34 and other devices, such as a local server 38 and/or a central data collection server 36, the wide-area network 40, or other communication networks (not shown) in a well-known manner, such as via the Transmission Control Protocol/Internet Protocol ("TCP/IP").

Figure 5:
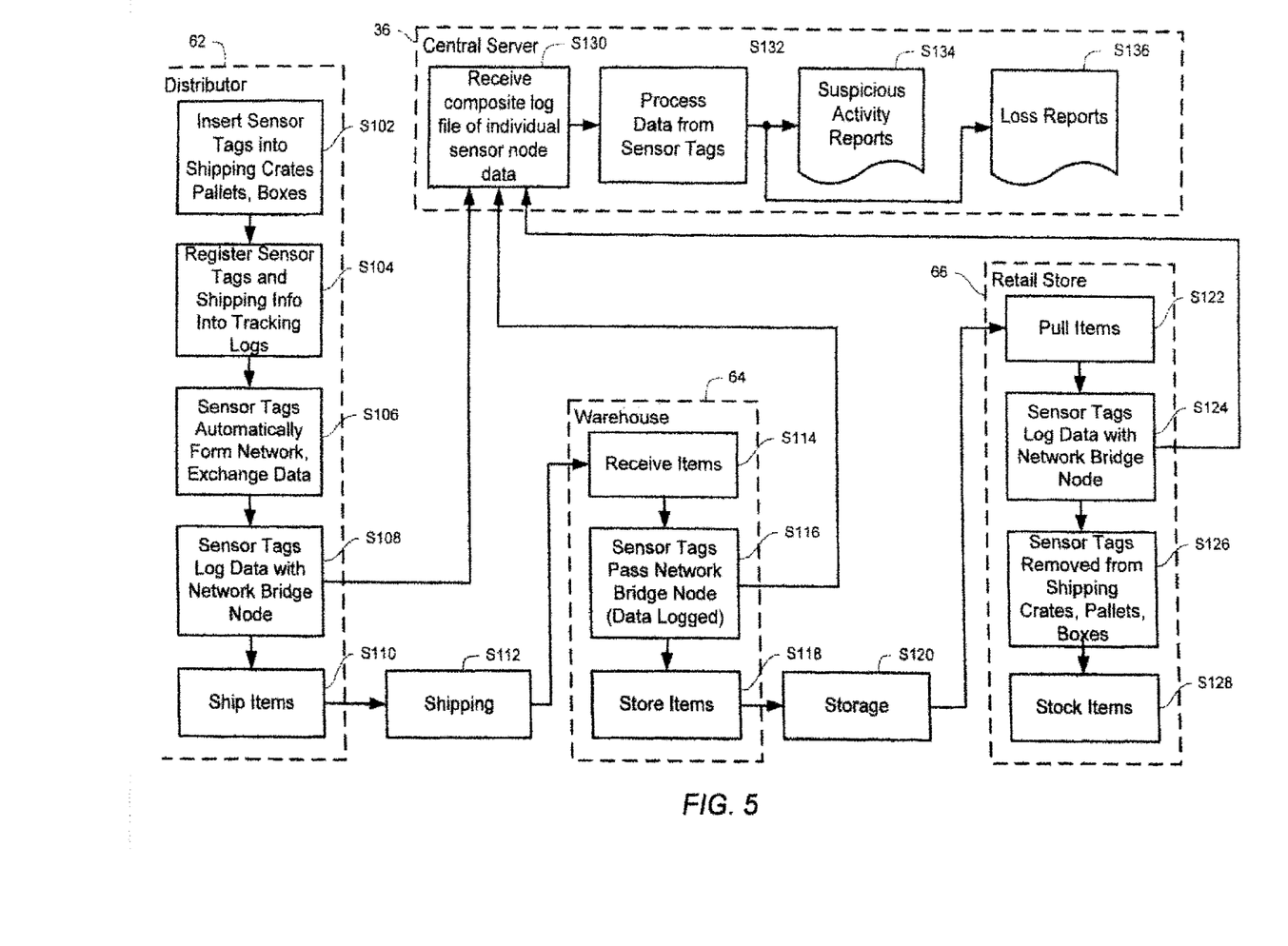
FIG. 5 is a process flow chart illustrating the roles of each participant in a supply chain for tracking and monitoring assets according to the principles of the present invention.

Referring now to FIG. 5, an exemplary process flow chart is provided that illustrates the roles of each participant in a supply chain for tracking and monitoring assets according to the principles of the present invention. At a distributor location 62, the mobile sensor nodes 12 are inserted into merchandise shipping containers, pallets or cases (step S102). The sensor nodes 12 are registered into a database of the central data collection server 36 with information relating to the corresponding merchandise with which they are shipped (step S104). The sensor nodes 12 exchange status data and automatically form a network which begins recording information about the presence and status of other sensor nodes 12 in the detectable vicinity (step S106). At this point, the sensor nodes 12 may be read (step S108) by a bridge node 34 to register data into the system database prior to shipment (step S110).

During shipment (step S112), the mobile sensor nodes 12 continue communicating periodically with one another and collectively storing information about the presence and status of other sensor nodes in the detectable vicinity. If one of the sensor nodes 12 is removed from the shipment, data about its prior presence and status is stored on the other nodes 12 in the shipment. Further, the on-board sensors 24 may be used to detect changes in the conditions of the packaging to determine if the packaging is being tampered with during shipment. This information may also be stored in the mobile sensor nodes 12 to detect tampering.

The shipment is received at the warehouse 64 (step S114). At that time, the mobile sensor nodes 12 are read by the network bridge node 34 and the data that is stored in the individual nodes 12 is logged into the system database (step S116). The shipment may then be sent to storage (step S118).

During storage (step S120), the mobile sensor nodes 12 may continue to communicate periodically with one another, again collectively storing information about the presence and status of other sensor nodes 12 in the vicinity. Again the on-board sensors 24 may be used to detect changes in conditions of the packaging to detect tampering. At some point, the merchandise is removed from storage and sent to the retailer 66.

At the retailer 66, during the normal course of business, shipping containers are pulled so that the items may be sold (step S122). Again, the mobile sensor nodes 12 are read by a bridge network node 34 and the data that is stored in the individual nodes 12 is logged into the system database (step S124). The mobile sensor nodes 12 are removed from the shipping crates, pallets or case packaging and are sent back to the distributor 62 for reuse during the next shipment (step S126). The individual items are then stocked on the retailer's shelves for sale (step S128).

The central data collection server 36 receives the data from the bridge network nodes 34 (step S130). The received data may include a composite log of data collected from individual sensor nodes 12. The central server processes the data from the individual sensor nodes 12 to detect anomalies or other data that suggest theft or tampering (step S 132). This data may then be analyzed to generate suspicious activity reports (step S134) or loss records (step S 136) that may include the time, type of event, GPS location data, and other useful information about when a loss or suspicious activity occurred during shipment or storage.

One embodiment of the present invention includes provisions to allow the mobile sensor nodes 12 to conserve power by operating in a sleep mode during periods when little activity is occurring. However it is important that the system 10 is able to wake up when important events occur. Several approaches to allow for storage of data are possible, however an exemplary embodiment of this invention includes the ability to have one or more sensor nodes 12 in an "awake" state at all times so that these awake nodes 12 can record events that happen on other nodes so that sensor data can be stored in collectively even if a sensor node is stolen. One method for providing one or more sensor nodes 12 in an awake state is to assign "watchman duty" periods to each of the sensor nodes 12 in a round robin fashion so that one or more of the sensor nodes is always on watch.

Figure 6:
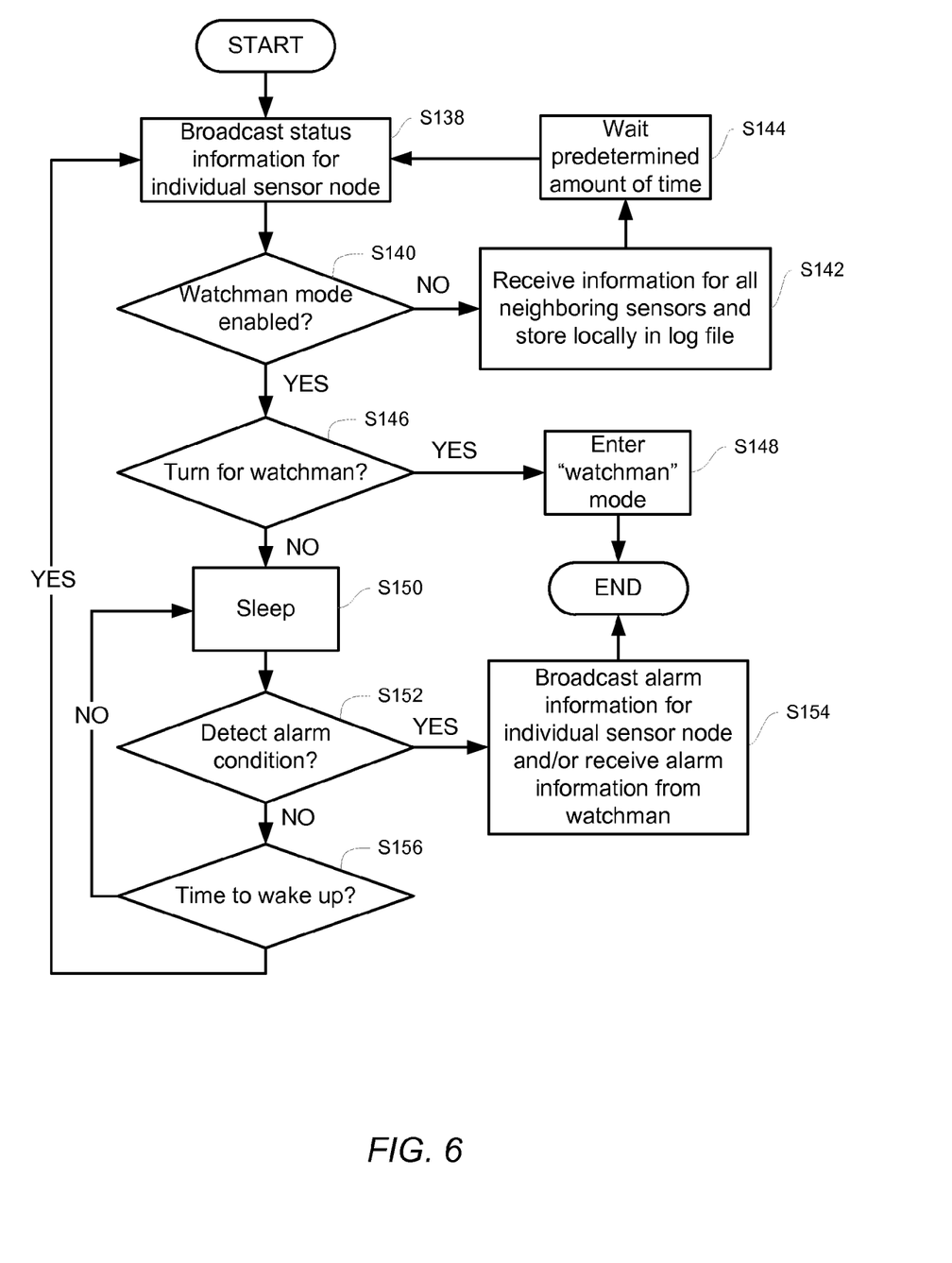
FIG. 6 is a flowchart of an exemplary mobile asset tracking process performed by a mobile sensor node according to the principles of the present invention.

FIG. 6 provides an exemplary operational flowchart that describes steps performed by a mesh network monitoring module 29 of an individual mobile sensor node 12 for actively monitoring the entire mobile sensor mesh network 10. The mobile sensor node 12 broadcasts its status information (step S138). The status information may include a mobile sensor node identifier, a present alarm condition, the time, a GPS location, the temperature, etc. If the mobile sensor mesh network 10 is not operating in watchman mode (step S140), this information may be received by all the other mobile sensor nodes 12 of the mobile sensor mesh network 10. Additionally, the individual sensor node 12 receives status information for all other neighboring sensors 12 within a detectable range and stores the information in a log file 28 (step S142). The mobile sensor node 12 waits a predetermined interval of time (step S144) before rebroadcasting its status information (step S138).

Figure 7:
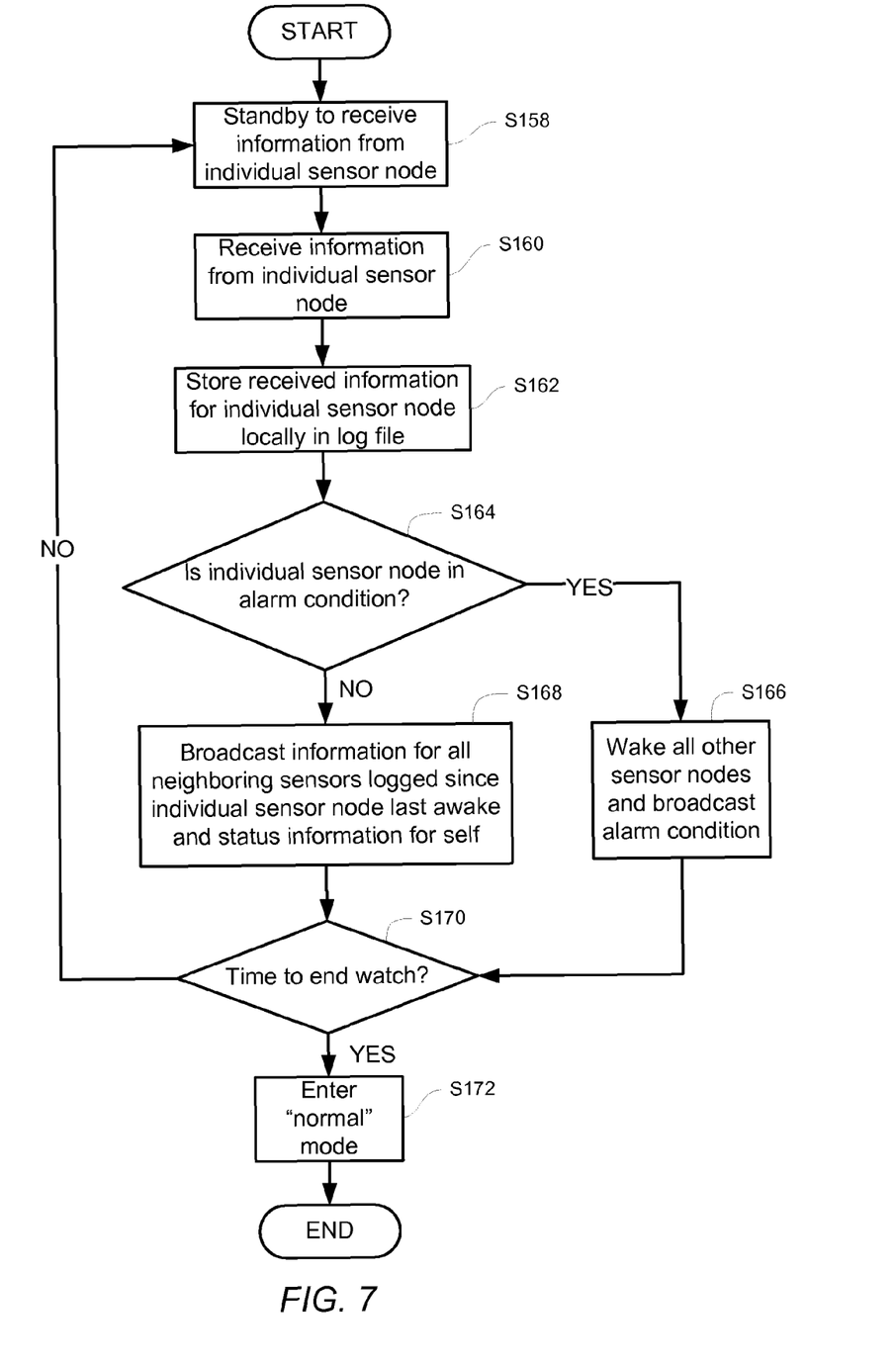
FIG. 7 is a flowchart of another exemplary mobile asset tracking process performed by a mobile sensor node according to the principles of the present invention.

If the mobile sensor mesh network 10 is operating in watchman mode (step S140) and it is time for the sensor node 12 to take its turn in watchman duty (step S146), then the sensor node 12 enters "watchman" mode (step S148). The flowchart of FIG. 7 provides details of one exemplary implementation of watchman mode and is discussed in greater detail below.

If it is not time for the sensor node 12 to take its turn in watchman duty (step S146), then the sensor node 12 "sleeps" for a predetermined amount of time. During sleep, the sensor node 12 operates in a reduced power mode wherein most of its elements are shut-down or in a standby mode that consumes less electrical current. For example, local oscillators and amplifiers in the network radio 20 and the GPS receiver 30 are disabled, and the microprocessor 14 and/or memory 22 may shut down certain functions in order to consume less power. However, select on-board sensors 24 may remain functional at all times, allowing the sensor node 12 to detect an alarm condition. Additionally the microprocessor 14 may periodically enable sufficient resources, even during sleep mode, to allow the sensor node 12 to receive an alarm notification from the "watchman" node presently on duty.

If the sensor node 12 detects an alarm condition (step S152), depending upon whether it detected an alarm condition for the individual node or whether it received an alarm notification from the watchman node, the sensor node 12 broadcasts its alarm information and/or receives alarm information from the watchman node (step S154).

As long as the sensor node 12 does not detect an alarm condition (step S152), it will remain in sleep mode until a predetermined time to wake up (step S156). When the sensor node awakens, it rebroadcasts its status information (step S138). With each sensor node 12 in the mobile sensor mesh network 10 operating in the above manner, each node 12 maintains a complete log of status information for each sensor node 12 of the mesh network 10 for the entire duration that the network 10 is functioning, e.g., shipping duration, storage duration, etc. Thus, even if one node 12 is disabled, stolen or destroyed, the remaining sensor nodes 12 have a record containing the exact history of the missing node.

Turning now to FIG. 7, a flowchart is provided that details one exemplary method of operation for a sensor node 12 operating as in the "watchman" mode. While on watchman duty, the sensor node is continually on standby to receive information from individual sensor nodes 12 (step S158). When the watchman node receives information from an individual sensor node 12 (step S160), it stores the received information locally in a log file 28 (step S162). If the received individual sensor node information indicates that the sensor node 12 is in an alarm condition (step S164), the watchman node wakes all the other sensor nodes 12 in the mesh network 10 and broadcasts an alarm notification containing information relating to the alarm condition (step S166).

As long as the watchman node does not detect an alarm condition (step S164), it broadcasts information to the individual sensor node 12 for all neighboring sensor nodes 12 received and logged since the individual node 12 was last awake (step S168). When the predetermined amount of time for the sensor node 12 to be on watch duty expires (step S170), the sensor node 12 returns to a normal operation mode (step S172). Otherwise, the sensor node 12 continues to standby to receive information from other individual sensor nodes 12 (step S158).

Alternatively, instead of actively waking the other nodes 12 upon detecting an alarm condition (step S164), the watchman node may simply continue to passively gather information from sensor nodes 12 and relay notification of the alarm condition as part of the information transmitted during normal operation.

Figure 8:
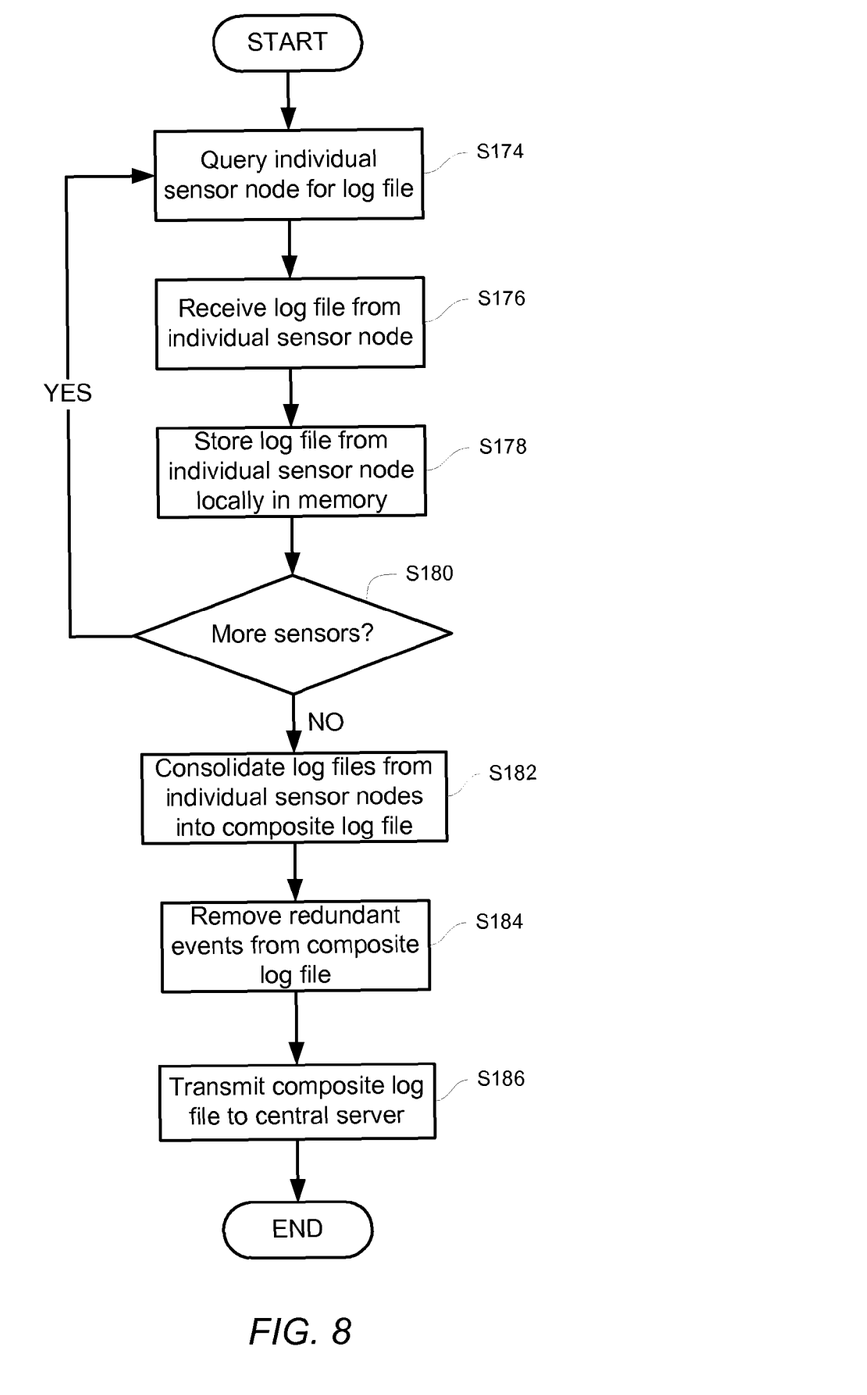
FIG. 8 is a flowchart of an exemplary mobile asset tracking process performed by a sensor bridge node according to the principles of the present invention.

FIG. 8 provides an exemplary operational flowchart that describes steps performed by a network bridge node 34 for gathering, consolidating and reporting information relating to the mobile sensor mesh network 10. The network bridge node 34 queries one of the individual sensor nodes 12 of the mobile sensor mesh network 10, requesting the sensor node 12 to transmit its log file 28 (step S174). The network bridge node 34 receives the log file 28 from the sensor node (step S176) and stores the log file 28 locally in memory 52 (step S178). If there are other sensor nodes 12 in the mesh network 10 that have not been queried (step S180), the network bridge node 34 may optionally repeat the above process for all, or a portion of the sensor nodes 12 in the mobile sensor mesh network 10.

Otherwise, if more than one log file 28 has been received from individual sensor nodes 12, the network bridge node 34 consolidates the log files 28 into a composite log file 53 (step S182) and removes any redundant events from the composite log 53 (step S184). The network bridge node 34 transmits the composite log 53 to the central data collection server 36 and/or the local data collection server 38, as appropriate (step S186).

An embodiment of the present invention advantageously provides a method and means for the collective storage of information in the mobile sensor nodes 12 to preserve data even when nodes are stolen, destroyed, or tampered with. Thus, information and evidence relating to the loss or theft of an item is preserved even when actual pieces of the system are lost.

Additionally, an embodiment of the present invention advantageously utilizes a round robin "watch duty" approach for power savings while allowing each of the mobile sensor nodes 12 to sleep most of the time. The watch duty approach for power savings allows a mobile sensor mesh network 10 to be deployed without the need for a designated high power coordinator. This also enables a system to work without a single point of failure at the coordinator.

With the development of chipsets and protocols for wireless sensor network communications such as Zigbee, or BLUETOOTH, inexpensive, low power communication nodes are possible. A wireless sensor node 12 may be deployed inexpensively enough such that it is attractive for supply chain monitoring at the shipping container or pallet level and, possibly, even at a per case level. This type of device may also be deployed in situations where high-value or high-theft merchandise is being shipped and loss prevention professionals are building a case for prosecution.

The present invention can be realized in hardware, software, or a combination of hardware and software. Any kind of computing system, or other apparatus adapted for carrying out the methods described herein, is suited to perform the functions described herein.

A typical combination of hardware and software could be a specialized or general purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for supply chain monitoring in a communication network, the communication network including a plurality of mobile sensor nodes, the method comprising:

each of the plurality of mobile sensor nodes receiving status information obtained by other mobile sensor nodes in the communication network;

each of the plurality of mobile sensor nodes periodically transmitting the received status information to at least one other mobile sensor node in the communication network;

each of the plurality of mobile sensor nodes compiling at least one log file, the at least one log file including the received status information;

each of the plurality of mobile sensor nodes storing the at least one log file, and responsive to determining, via a mobile sensor node operating in a watchman mode, that any of the plurality of mobile sensor nodes are in an alarm condition, waking the mobile sensor nodes not operating in the watchman mode from a sleep mode.

2. The method of claim 1, wherein each of the plurality of mobile sensor nodes further comprising securing the other mobile sensor nodes in the communication network to corresponding items being monitored.

3. The method of claim 2, wherein the other mobile sensor nodes in the communication network are secured to corresponding items being monitored during shipping.

4. The method of claim 1, further comprising:

each of the plurality of mobile sensor nodes transmitting the at least one log file to a collection data server; and consolidating the at least one log file into a composite log file.

5. The method of claim 4, further comprising:

identifying at least one of a discrepancy and an alarm notification in the composite log file; and reporting the identified at least one of a discrepancy and an alarm notification.

6. The method of claim 1, wherein at least one of the plurality of mobile sensor nodes operates in the watchman mode, the method further comprising placing the mobile sensor nodes not operating in the watchman mode in the sleep mode.

7. The method of claim 6, wherein the at least one of the plurality of mobile sensor nodes periodically operates in the watchman mode.

8. The method of claim 6, wherein each of the at least one of the plurality of mobile sensor nodes operating in the watchman mode operates in a standby mode to receive the status information from other mobile sensor nodes operating in the watchman mode; and determines whether any of the plurality of mobile sensor nodes are in an alarm condition based on the received status information.

9. A method for supply chain monitoring, the method comprising:
   establishing a communication network, the communication network including a plurality of mobile sensor nodes;
   each of the plurality of mobile sensor nodes receiving status information obtained by other mobile sensor nodes in the communication network;
   each of the plurality of mobile sensor nodes periodically transmitting the received status information to at least one other mobile sensor node in the communication network;
   each of the plurality of mobile sensor nodes compiling at least one log file, the at least one log file including the received status information;
   each of the plurality of mobile sensor nodes storing the at least one log file;
   at least one of the plurality of mobile sensor nodes operating in a watchman mode, the at least one of the plurality of mobile sensor nodes operating in the watchman mode operates in a standby mode to receive the status information from other mobile sensor nodes operating in the watchman mode, and determines whether any of the plurality of mobile sensor nodes are in an alarm condition based on the received status information;
   placing the mobile sensor nodes not operating in the watchman mode in a sleep mode; and
   responsive to determining that any of the plurality of mobile sensor nodes are in an alarm condition, the watchman mode further comprising:
      waking the mobile sensor nodes not operating in the watchman mode from the sleep mode; and
      transmitting a notification of the alarm condition.

10. The method of claim 9, wherein the watchman mode further comprises:
   transmitting all status information received from the other mobile sensor nodes of the plurality of mobile sensor nodes in the communication network since the previous time status information was received from the other mobile sensor nodes of the plurality of mobile sensor nodes;
   transmitting status information for the mobile sensor node operating in the watchman mode; and
   responsive to determining that at least one of the other mobile sensor nodes is in an alarm condition, transmitting a notification of the alarm condition.

11. The method of claim 9, wherein the received status information obtained by other mobile sensor nodes in the communication network includes at least one of a mobile sensor node identifier, a present alarm condition, a time, a GPS location, and a temperature.

12. A system for supply chain monitoring, the system comprising:
   a plurality of mobile sensor nodes, at least one of the plurality of mobile sensor nodes operable in a watchman mode to determine if a different one of the plurality of mobile sensor nodes is in an alarm condition, and when the different one of the plurality of mobile sensor nodes is in an alarm condition, to wake the plurality of mobile sensor nodes not operating in the watchman mode from a sleep mode;
   a data collection server; and
   a network bridge communicatively coupled to the data collection server and to at least one mobile sensor node of the plurality of mobile sensor nodes, the network bridge operating to:
      receive at least one log file, the at least one log file containing status information obtained by other mobile sensor nodes of the plurality of mobile sensor nodes; and
      transmit the log file to the data collection server,
      each of the plurality of mobile sensor nodes periodically transmitting the status information to at least one other mobile sensor node.

13. The system of claim 12, further comprising:
   a communication network, the communication network including at least some of the plurality of mobile sensor nodes, each mobile sensor node operating to:
      periodically transmit status information;
      receive status information for at least one other mobile sensor node in the communication network;
      compile a log file, the log file including the received status information; and
      store the log file in the mobile sensor node that received the corresponding status information.

14. The system of claim 13, wherein the data collection server further operates to:
   receive at least one log file, the at least one log file containing status information for each mobile sensor node in the communication network;
   receive a composite log file containing multiple log files, each log file containing status information for each mobile sensor node in the communication network;
   identify an occurrence of at least one of a discrepancy and an alarm notification in the composite log file; and
   report the occurrence of the identified at least one of a discrepancy and an alarm notification.

15. A first mobile sensor node in a communication network for supply chain monitoring, the communication network including the first mobile sensor node and other mobile sensor nodes to form a plurality of mobile sensor nodes, the first mobile sensor node comprising:
   a transceiver operating to:
      receive status information obtained by other mobile sensor nodes in the communication network; and
      periodically transmit the status information to at least one other mobile sensor node in the communication network;
   a processor communicatively coupled to the transceiver, the processor operating to compile a log file, the log file including status information for each of the other mobile sensor nodes in the communication network, the processor further operating in a watchman mode, and responsive to determining that any of the plurality of other mobile sensor nodes are in an alarm condition, waking mobile sensor nodes not operating in the watchman mode from a sleep mode; and
   a memory communicatively coupled to the processor, the memory storing the log file.

16. The first mobile sensor node of claim 15, wherein the status information includes at least one of a mobile sensor node identifier, a present alarm condition, a time, a GPS location, and a temperature, the first mobile sensor node further having at least one of an on-board sensor, a real-time clock and a GPS receiver.

17. The first mobile sensor node of claim 15, wherein the processor further operates to place the first mobile sensor node in a sleep mode when not operating in the watchman mode.

18. The first mobile sensor node of claim 17, wherein when the first mobile sensor node operates in the watchman mode:
  the transceiver further operates in a standby mode to receive the status information from the other mobile sensor nodes in the communication network; and
  the processor further operates to determine whether the other mobile sensor nodes in the communication network are in an alarm condition based on the received status information.

19. A first mobile sensor node in a communication network for supply chain monitoring, the communication network including the first mobile sensor node and other mobile sensor nodes to form a plurality of mobile sensor nodes, the first mobile sensor node comprising:
  a transceiver operating to:
    receive status information obtained by other mobile sensor nodes in the communication network; and
    periodically transmit the status information to at least one other mobile sensor node in the communication network;
  a processor communicatively coupled to the transceiver, the processor operating to compile a log file, the log file including status information for each of the other mobile sensor nodes in the communication network; and
  a memory communicatively coupled to the processor, the memory storing the log file,
  the first mobile sensor node operating in a watchman mode, the processor further operating to place the first mobile sensor node in a sleep mode when not operating in the watchman mode, wherein when the first mobile sensor node operates in the watchman mode, the transceiver further operates in a standby mode to receive the status information from the other mobile sensor nodes in the communication network, and the processor further operates to determine whether at least one of the other mobile sensor nodes in the communication network are in an alarm condition based on the received status information, and
  responsive to determining that at least one of the other mobile sensor nodes are in an alarm condition, the transceiver further operates to:
    wake all other mobile sensor nodes of the communication network from sleep mode; and
    transmit a notification of the alarm condition.

20. The first mobile sensor node of claim 19, wherein the periodically transmitting includes:
  transmitting all status information received from the other mobile sensor nodes of the plurality of mobile sensor nodes of the communication network since the last time status information received from the other mobile sensor nodes of the plurality of mobile sensor nodes in the communication network was transmitted.

* * * * *